(12) United States Patent
Tek et al.

(10) Patent No.: US 6,947,040 B2
(45) Date of Patent: Sep. 20, 2005

(54) VESSEL DETECTION BY MEAN SHIFT BASED RAY PROPAGATION

(75) Inventors: Huseyin Tek, Princeton, NJ (US); Dorin Comaniciu, Princeton, NJ (US); James Williams, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 199 days.

(21) Appl. No.: 10/274,465

(22) Filed: Oct. 18, 2002

(65) Prior Publication Data

US 2003/0095121 A1 May 22, 2003

Related U.S. Application Data

(60) Provisional application No. 60/347,915, filed on Oct. 23, 2001.

(51) Int. Cl.[7] .............................................. G06T 17/00
(52) U.S. Cl. ........................ 345/420; 345/428; 382/128; 382/173
(58) Field of Search ................................ 345/420, 428, 345/606, 621, 622; 382/130, 128, 132, 173, 131

(56) References Cited

U.S. PATENT DOCUMENTS

| | | | | |
|---|---|---|---|---|
| 6,047,090 A | * | 4/2000 | Makram-Ebeid | 382/257 |
| 6,385,332 B1 | * | 5/2002 | Zahalka et al. | 382/128 |
| 6,785,409 B1 | * | 8/2004 | Suri | 382/128 |

OTHER PUBLICATIONS

Hwang et al., "Atherosclerotic plaque segmentation at human carotid artery based on multiple constrast weighting MR images", Image Processing 2001 Proceedings. 2001 International Conference on, vol. 2, Oct. 7–10, 2001 Page(s):849–852 vol. 2.*

Comaniciu, and Meer. Mean Shift Analysis and Applications, Sep. 20–27, 1999, IEEE.*

Dorin Comaniciu, Peter Meer, Mean Shift Analysis and Applications, Rutgers University, Piscataway, New Jersey, pp. 1–8.

* cited by examiner

Primary Examiner—Richard Hjerpe
Assistant Examiner—Daniel Hajnik
(74) Attorney, Agent, or Firm—Donald B. Paschburg; F. Chau & Associates, LLP (57) ABSTRACT

A method for segmentation of 2D structures in CT and MR images is provided. The method is based on 2D ray propagation by mean-shift analysis with a smoothness constraint. Ray propagation is used to guide an evolving curve due to its computational efficiency and shape priors are incorporated for robust convergence. The method includes the steps of receiving 2D image data; visualizing the 2D image data on a display device; selecting a structure in the 2D image data by placing a seed in the structure; initializing a plurality of rays from the seed to form a curve; determining a speed function of each of the rays; evolving the curve by propagating the rays based on the speed function of each of the rays; converging the rays on a boundary of the structure; and segmenting the structure when all of the rays have converged on the structure's boundary.

19 Claims, 5 Drawing Sheets

VESSEL DETECTION BY MEAN SHIFT BASED RAY PROPAGATION

PRIORITY

This application claims priority to an application entitled "VESSEL DETECTION BY MEAN SHIFT BASED RAY PROPAGATION" filed in the United States Patent and Trademark Office on Oct. 23, 2001 and assigned Ser. No. 60/347,915, the contents of which are hereby incorporated by reference.

BACKGROUND OF THE INVENTION

1. Field of the Invention

The present invention relates generally to computer vision and imaging systems, and more particularly, to a system and method for segmentation of 2D medical structures by mean shift based ray propagation. More specifically, the present invention relates to segmentation of vessel cross-sections in contrast enhanced CT (computerized tomography) and MR (magnetic resonance) images.

2. Description of the Related Art

Images produced by contrast-enhanced magnetic resonance angiography (CE-MRA) and computed tomography angiography (CTA) are becoming an increasingly important tool in the field of medicine. In the CE-MRA imaging protocol, a contrast agent, usually based on the rare-earth element Gadolinium (Gd) (a highly paramagnetic substance), is injected into the bloodstream. In such images, blood vessels and organs perfused with the contrast agent appear substantially brighter than surrounding tissues. In CTA, a contrast agent is injected into the bloodstream which increases the radio-opacity of the blood making the vessels appear dense.

The goal of the majority of CTA/CE-MRA examinations is diagnosis and qualitative or quantitative assessment of pathologies in the circulatory system. The most common pathologies are aneurysms and stenosis caused by arterial plaques. The modern clinical workflow for the reading of these images increasingly involves interactive 3D visualization methods, such as volume rendering for quickly pinpointing the location of the pathology. Once the location of the pathology is determined, quantitative measurements can be made on the original 2D slice data or, more commonly, on 2D multi-planar reformat (MPR) images produced at user-selected positions and orientations in the volume. In the quantification of stenosis, it is desirable to produce a cross-sectional area/radius profile of a vessel so that one can compare pathological regions to patent (healthy) regions of the same vessel, i.e., to segment the vessel from the background of an image.

There is an extensive body of work on the segmentation of structures (such as air-ways) from CTA and MRA images. This work is based largely on deformable models such as snakes, balloons, levels-sets, and region-competition.

Active contours, or snakes are deformable models based on energy minimization of controlled-continuity splines. When snakes are placed near the boundary of objects to be segmented, they will lock onto salient image features under the guidance of internal and external forces. For example, let $C(s)=(x(s),y(s))$ be the coordinates of a point on the snake, where s is the length parameter. The energy functional of a snake is defined as $$E(C) = \int_0^1 [E_{int}(C(s)) + E_{image}(C(s)) + E_{con}(C(s))]ds \quad (1)$$

where $E_{int}$ represents the internal energy of the spline due to bending, $E_{image}$ represents image forces, and $E_{con}$ are the external constraint forces. First, the internal energy, $$E_{int} = w_1|C'(s)|^2 + w_2|C''(s)|^2, \quad (2)$$

imposes regularity on the curve, where $w_1$ and $w_2$ corresponds to elasticity and rigidity, respectively. Second, the image forces are responsible for pushing the snake towards salient image features. The local behavior of a snake can be studied by considering the Euler-Lagrange equation, $$\begin{cases} -(w_1 C')' + (w_2 C'')'' = F(C), \\ C(0), C'(0), C(1) \text{ and } C'(1) \text{ given}, \end{cases} \quad (3)$$

where $F(C)$ captures the image and external constraint forces. Note that the energy surface E is typically not convex and can have several local minima. Therefore, to reach the solution closest to the initialized snake, the associated dynamic problem is solved instead of the static problem. When the solution $C(t)$ stabilizes, a solution to the static problem is achieved.

$$\begin{cases} \dfrac{\partial C}{\partial t} - (w_1 C')' + (w_2 C'')'' = F(C) \\ \text{initial + boundary conditions} \end{cases} \quad (4)$$

Snakes perform well when they are placed close to the desired shapes to be segmented. However, a number of fundamental difficulties remain; in particular, snakes heavily rely on a proper initialization close to the boundary of an object of interest and multiple initializations are required when multiple objects are to be segmented, i.e., one per object of interest.

To overcome some of the initialization difficulties with snakes, a balloon model was introduced as a new deformable model based on the snakes idea. This model resembles a "balloon" which is inflated by an additional force which pushes the active contour to object boundaries, even when it is initialized far from the initial boundary. However, the balloon model, like snakes, cannot perform topological changes, i.e., balloons can not merge with other balloons and balloon can not split.

Since snakes and balloons cannot easily capture topological changes, the snake or balloon methods require extensive user interaction for images with multiple objects. This problem can be resolved by the use of the level set evolution, as is known in the art. Under the level set approach, consider a curve C as the zero level set of a surface, $\phi(x, y)=0$. The zero level set of the function $\phi, \{x \in R^2 : \phi(t,x)=0\}$, evolves in the normal direction according to $$\frac{\partial \phi}{\partial t} = g(x, y)|\nabla \phi|\left(\text{div}\left(\frac{\nabla \phi}{|\nabla \phi|}\right) + v\right), \quad (5)$$

where $$g(x, y) = \frac{1}{1 + (\nabla G_\sigma * I)^2},$$

v is a positive real constant, $G_\sigma * I$ is the convolution of the image I with the Gaussian $G_\sigma$, and $\phi_0$ is the initial data which is a smoothed version of the function $1-X_\Gamma$, where $X_\Gamma$ is the characteristic function of a set $\Gamma$ containing the object of interest in the image. The gradient of the surface $\nabla\phi$ is the normal to the level set $C, \vec{N}$, and the term div $$\text{div}\left(\frac{\nabla\phi}{|\nabla\phi|}\right)$$

is its curvature K.

Unlike snakes, this active contour model is intrinsic, stable, i.e., the PDE (partial differential equation) satisfies the maximum principle, and can handle topological changes such as merging and splitting without any computational difficulty. A key disadvantage of the level set method is its high computational complexity, due to the additional embedding dimensional, even when the computation is restricted to a narrow band around the curve. To overcome the computational complexity, narrow band level set evolutions have proposed. However, these methods are still not fast enough for real-time image segmentation.

SUMMARY OF THE INVENTION

A robust and efficient method and system for the segmentation of vessel cross-sections in contrast enhanced CT and MR images is provided. The present invention utilizes boundary propagation by mean shift analysis combined with a smoothness constraint. Consequently, the robustness of the mean shift to noise is further enhanced by the use of a priori information on boundary smoothness. Additionally, the incorporation of the smoothness constraint into the method and system of the present invention allows boundary finding in the presence of eccentricities like calcifications (CT) or small branching vessels. The present invention allows real-time segmentation of medical structures found in multi-modality images (CT, MR, etc.).

According to one aspect of the present invention, a method for segmenting structures from two-dimensional (2D) images is provided including the steps of receiving 2D image data; visualizing the 2D image data on a display device; selecting a structure in the 2D image data by placing a seed in the structure; initializing a plurality of rays from the seed to form a curve; determining a speed function of each of the plurality of rays; evolving the curve by propagating the plurality of rays based on the speed function of each of the plurality of rays; converging the plurality of rays on a boundary of the structure; and segmenting the structure when all of the plurality of rays have converged on the structure's boundary. The method further includes the step of determining an area of the segmented structure.

The evolving the curve step includes performing a mean-shift analysis on each of the plurality of rays to identify image discontinuities, the image discontinuities defining the structure's boundary. Furthermore, the performing a mean-shift analysis includes the steps of determining a joint spatial-range domain for each of the plurality of rays, the joint spatial-range domain including for each pixel along each of the plurality of rays at least one location value and at least one intensity value; defining a point of convergence for each of the plurality of rays to identify the discontinuities based on an intensity value; and determining a displacement vector for each of the plurality of rays, the displacement vector being a distance between a point on an individual ray and a convergence point on the individual ray.

According to another aspect of the present invention, wherein if an absolute value of a gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary. Additionally, wherein if an absolute value of a gradient of the displacement vector of the individual ray is less than a predetermined value, the individual ray is propagated from the seed to the boundary.

According to a further aspect of the method, the evolving the curve step includes applying a smoothness constraint to the evolving curve. The applying a smoothness constraint includes filtering the speed function of an individual ray of the plurality of rays based on a neighboring ray. Additionally, the applying a smoothness constraint includes imposing a curvature on the evolving curve based on shape priors.

The selecting step includes clicking on the structure with a computer mouse.

According to another aspect of the present invention, a program storage device readable by a machine, tangibly embodying a program of instructions executable by the machine to perform method steps for segmenting structures from two-dimensional (2D) images is provided. The method steps include receiving 2D image data; visualizing the 2D image data on a display device; selecting a structure in the 2D image data by placing a seed in the structure; initializing a plurality of rays from the seed to form a curve; determining a speed function of each of the plurality of rays; evolving the curve by propagating the plurality of rays based on the speed function of each of the plurality of rays; converging the plurality of rays on a boundary of the structure; and segmenting the structure when all of the plurality of rays have converged on the structure's boundary. The program storage device further includes the step of determining an area of the segmented structure.

The program storage device performs a mean-shift analysis on each of the plurality of rays to identify image discontinuities, the image discontinuities defining the structure's boundary. The mean-shift analysis includes the steps of determining a joint spatial-range domain for each of the plurality of rays, the joint spatial-range domain including for each pixel along each of the plurality of rays at least one location value and at least one intensity value; defining a point of convergence for each of the plurality of rays to identify the discontinuities based on an intensity value; and determining a displacement vector for each of the plurality of rays, the displacement vector being a spatial distance between a point on an individual ray and a convergence point on the individual ray.

According to another aspect of the present invention, the program storage device determines if an absolute value of a gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary. Further, wherein if an absolute value of a gradient of the displacement vector of the individual ray is less than a predetermined value, the individual ray is propagated from the seed to the boundary.

According to a further aspect of the present invention, the program storage device includes applying a smoothness constraint to the evolving curve. The applying a smoothness constraint includes filtering the speed function of an individual ray of the plurality of rays based on a neighboring ray. Further, the applying a smoothness constraint includes imposing a curvature on the evolving curve based on shape priors.

According to yet another aspect of the present invention, a system for segmenting structures from two-dimensional (2D) images is provided. The system includes an input device for receiving 2D image data; a display device for visualizing the 2D image data; a cursor control device for selecting a structure in the 2D image data by placing a seed in the structure; and a processor for segmenting the structure from the 2D image data.

According to another aspect, the processor initializes a plurality of rays from the seed to form a curve, determines a speed function of each of the plurality of rays, evolves the curve by propagating the plurality of rays based on the speed function of each of the plurality of rays, converges the plurality of rays on a boundary of the structure, and segments the structure when all of the plurality of rays have converged on the structure's boundary. The processor includes a mean shift filter for filtering each of the plurality of rays to identify image discontinuities in each of the plurality of rays, the image discontinuities defining the structure's boundary. Additionally, the processor applies a smoothness constraint to the evolving curve.

According to a further aspect of the present invention the cursor control device is a mouse and a user places the seed in the structure by clicking on the structure.

BRIEF DESCRIPTION OF THE DRAWINGS

The above and other objects, features, and advantages of the present invention will become more apparent in light of the following detailed description when taken in conjunction with the accompanying drawings in which:

FIG. 5 illustrates several views of a vessel being segmented from an image in accordance with the present invention where FIG. 6 shows two examples of vessel segmentation illustrating the need for a smoothness constraint where

DETAILED DESCRIPTION OF PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

A basic problem in the segmentation of vessels from the background of an image is accurate edge localization, i.e., finding a boundary of the vessel, in the presence of noise. Most CT and MR images have significant noise levels. The present invention employs one dimensional mean shift analysis along a set of rays projecting radially from a user-placed seed point in the image. Noise along these rays is eliminated while edges are preserved. The envelope of these rays represents an evolving contour or curve which converges to the vessel lumen boundary. The method is parsimonious, examining only pixels along and adjoining these rays and the seed point.

It is important that the boundary determined by the method of the present invention be consistent and invariant to medium to large scale linear and non-linear image inhomogeneities. This is needed for the method to be insensitive to MR distortions. The use of constant threshold factors (such as Hounsfield-based thresholds in CT) would limit the ability of the method to adapt to varying contrast dosages or varying beam energies in CT. The present invention localizes the midpoint of a step-edge intensity profile of each ray as the boundary of the vessel. The choice of rise midpoint as the vessel lumen boundary is similar to the choice made by conventional full-width-half-maximum (FWHM) segmentation methods.

The method of the present invention requires constant parameters for the evolution equations and for a window size used for the mean shift filter. To make the method adapt to varying image qualities and modalities, the evolution parameters are determined dynamically from the local statistics of the image computed from a small neighborhood immediately adjacent to the user's seed point. Optionally, a fixed window size for the mean-shift filter will serve for detection over a broad range of vessel sizes.

For the purpose of illustration, the simplest usage case will be described. The user places a single seed point inside the vessel and a boundary contour is automatically generated. The method and system of the present invention implements a conventional axis extraction method to provide orthogonal slice positions.

Figure 1:
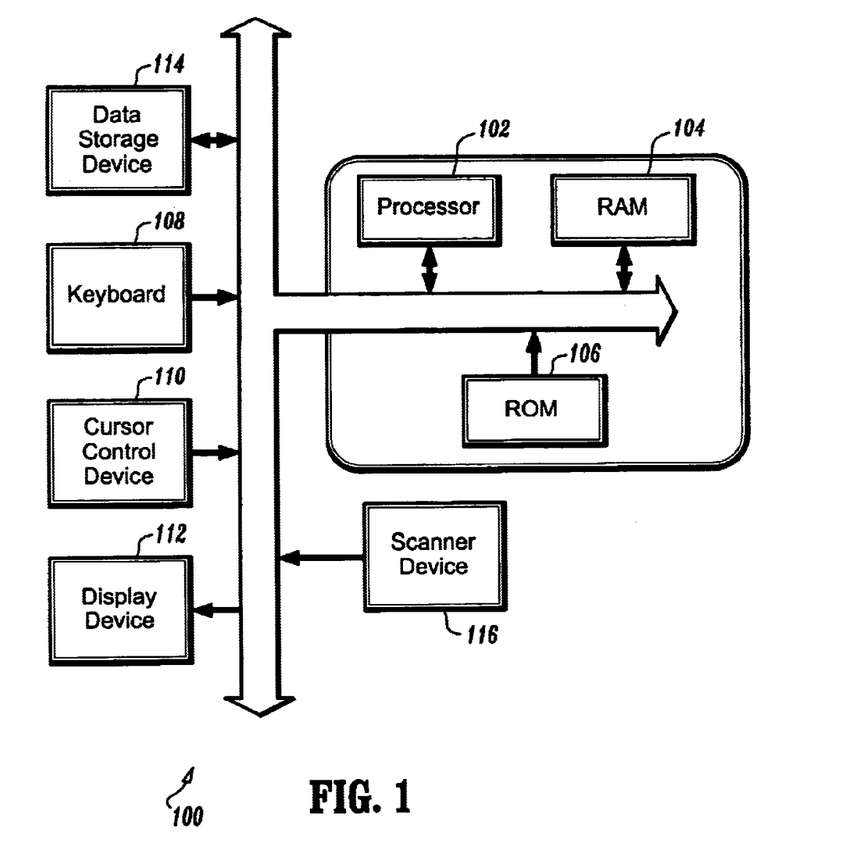
FIG. 1 is a block diagram of an exemplary system for segmenting medical structures by mean shift based ray propagation in accordance with the present invention.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture such as that shown in FIG. 1. Preferably, the machine 100 is implemented on a computer platform having hardware such as one or more central processing units (CPU) 102, a random access memory (RAM) 104, a read only memory (ROM) 106 and input/output (I/O) interface(s) such as keyboard 108, cursor control device (e.g., a mouse) 110 and display device 112. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device 114 and a printing device. Furthermore, a scanner device 116, for example an X-ray machine or MRI machine, may be coupled to the machine 100 for collecting image data.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
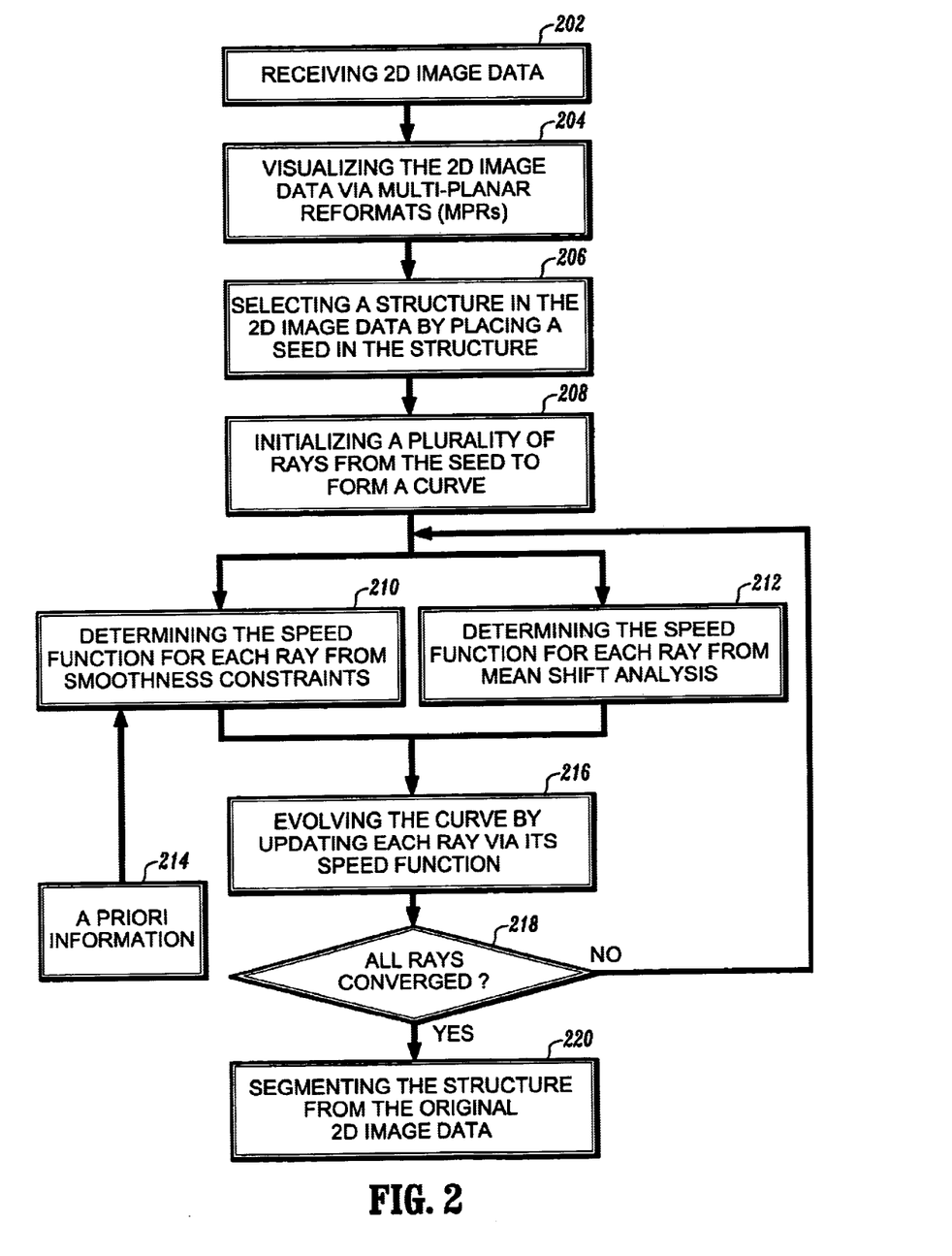
FIG. 2 is a flowchart illustrating a method for segmenting medical structures by mean shift based ray propagation in accordance with the present invention.
Figure 3A:
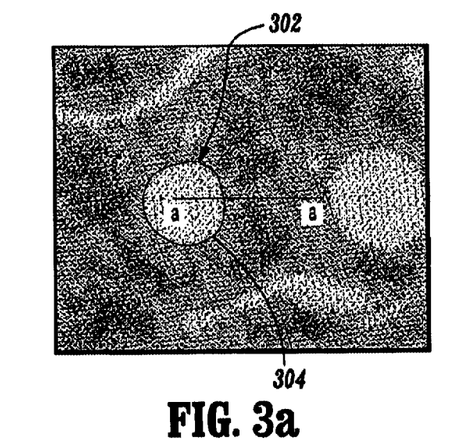
FIG. 3(a) is a CT (computerized tomography) image of the aorta including one ray illustrated as line a—a.
Figure 3B:
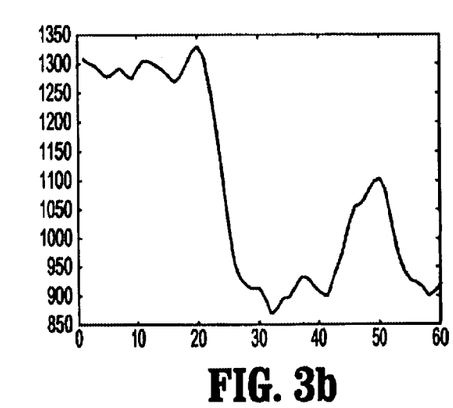
FIG. 3(b) is a graph representing a 1-dimensional intensity profile obtained along line a—a of FIG. 3(a)
Figure 3C:
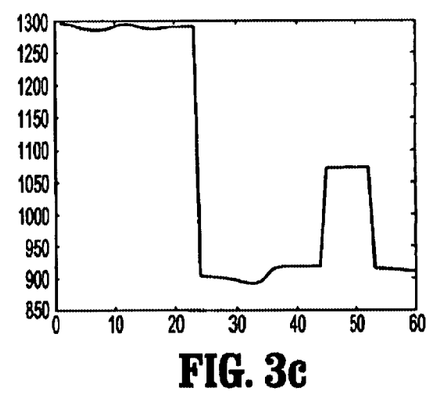
FIG. 3(c) is a graph illustrating the intensity profile of FIG. 3(b) after mean shift filtering.
Figure 3D:
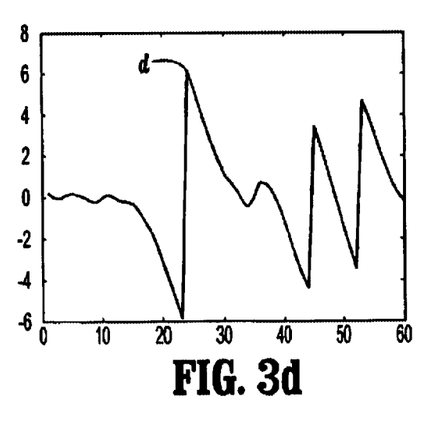
FIG. 3(d) is a graph illustrating displacement vectors of each spatial point of the intensity profile of FIG. 3(c)
Figure 3E:
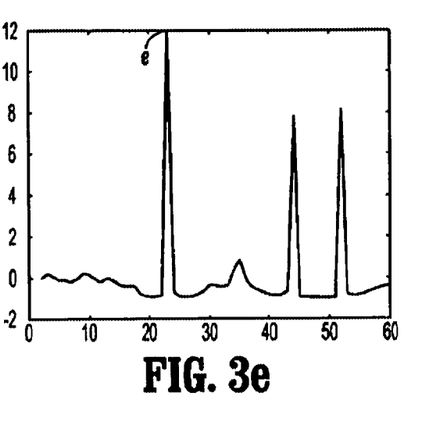
FIG. 3(e) is a graph illustrating a first derivative of each displacement vector shown in FIG. 3(d)

Referring to FIGS. 2 and 3, a method for segmenting 2D medical structures is presented. Initially, 2D image data is collected (Step 202) by the various means described above, e.g., X-rays, MRI, etc. Once the 2D image data has been received, the 2D image data is visualized via multi-planar reformats (MPRs) (Step 204), as illustrated in FIG. 3(a), on a display device such as a monitor. Within the segmentation method of the present invention, a user specifies a structure to be segmented by placing a single seed inside it, e.g., by clicking on the medical structure with a mouse or any other known cursor control device (Step 206). A boundary curve is then automatically generated via propagation of a plurality of rays from the seed point (Step 208).

The propagation is guided by image forces defined through mean-shift analysis (Step 212) and smoothness constraints (Step 210). The gradient-ascent mean-shift localizes edges of the structure accurately in the presence of noise and provides good computational performance, being based on local operators, i.e., operators that use information only from its small neighborhood in computations, thus avoiding extensive computations if a quantity is computed several times for each voxel. The smoothness constraint process (Step 210) is influenced by a priori knowledge of medical structures (Step 214).

The boundary curve is evolved by updating the speed function of each of the rays (Step 216) as described above, i.e., by mean-shift analysis (Step 212) and applying smoothness constraints (Step 210). The curve is evolved until all the rays converge on the boundary surface of the structure to be segmented (Step 218). Once all the rays have converged, the structure is defined and can be segmented from the original 2D image data (Step 220). Additionally, once the structure has been segmented, physical dimensions, e.g., area/radius, of the structure can be determined.

The development of the method of the present invention will now be described below in detail.

Ray Propagation

Let a front to be propagated be represented by a 2D curve $C(s,t)=(x(s,t),y(s,t))$ where x and y are the Cartesian coordinates, s is the length parameter, and t is the time. The evolution is then governed by $$\begin{cases} \dfrac{\partial C(s,t)}{\partial t} = c(x,y)\vec{N} \\ C(s,0) = C_0(s) \end{cases} \quad (6)$$

where $C_0(s)=(x(s,0),y(s,0))$ is the initial curve, and $\vec{N}$ is the unit normal vector propagation problem.

The method of the present invention is based on explicit front propagation via normal vectors. Specifically, the contour is sampled and the evolution of each sample is followed in time by rewriting the Eikonal equation in vector form, namely, $$\begin{cases} x_t(s,t) = c(x,y)\dfrac{y_s}{\sqrt{x_s^2+y_s^2}} \\ yt(s,t) = c(x,y)\dfrac{x_s}{\sqrt{x_s^2+y_s^2}} \end{cases} \quad (7)$$

This evolution is the "Lagrangian" solution since the physical coordinate system moves with the propagating wavefront or curve. However, the applications of ray propagation for curve evolution have been limited. Because when the normals to the wavefront collide (formation of shocks), this approach exhibits numerical instabilities due to an accumulated density of sample points, thus requiring special care, such as reparametrization of the wavefront. Also, topological changes are not handled naturally, i.e., an external procedure is required.

Previously, ray propagation has been used to implement a full-width at half-maximum (FWHM) technique for quantification of 2D airway geometry. In the FWHM technique, the maximum and minimum intensity values along the rays are computed to determine the "half-maximum" intensity value, which is the half intensity value between maximum and minimum. However, stable computation of maximum and minimum along the rays are quite difficult due to high signal variations. Additionally, ray propagation was used for fast segmentation of vessels and detection of their centerline by employing the intensity gradients to stop the propagation of rays. However, this approach faces difficulties when the vessels boundaries are not sharp, i.e., due to partial volume effects, and also when vessels contain isolated noises, e.g., calcifications in CT images.

The main shortcomings of these approaches stem from the computation of image gradients which are not robust relative to the image noise. The present invention uses mean shift analysis for detecting vessels boundaries efficiently and robustly. D. Comaniciu and P. Meer, "*Mean shift analysis and applications*", In IEEE International Conference on Computer Vision, pages 1197–1203, 1999, the contents of which are hereby incorporated by reference, shows that the image discontinuities, i.e., structure boundaries, are robustly revealed by a mean shift process which evolves in both the intensity and image space.

The following description will first describe the mean shift analysis; second, illustrate an approach where the mean shift procedure is applied to select discontinuities in a one dimensional signal; and finally, present the mean shift-based ray propagation approach for segmentation of medical structures, e.g., vessels.

Mean Shift Analysis

Given the set $\{x_1\}_{i=1 \ldots n}$ of d-dimensional points along a ray, the mean shift vector computed at location x is given by $$M_h(x) = \dfrac{\sum_{i=1}^{n} xK\left(\dfrac{x-x_i}{h}\right)}{\sum_{i=1}^{n} K\left(\dfrac{x-x_i}{h}\right)} - x \quad (8)$$

where K represents a kernel with a monotonically decreasing profile and h is the bandwidth of the kernel.

The mean shift vector represents an estimate of the normalized density gradient computed at location x, i.e., the mean shift vector always points towards the direction of the maximum increase in the density. As a result, the successive computation of the mean shift vector, followed by the translation of the kernel K by $M_h(x)$ will define a path that converges to a local maximum of the underlying density. This algorithm is called the mean shift procedure, a simple and efficient statistical technique for mode detection, i.e., the detection of peaks (or modes) of the underlying density.

The mean shift procedure is applied for the data points in the joint spatial-range domain, where the space of a 2-dimensional lattice represents the spatial domain and the space of intensity values constitutes the range domain. In this approach, a data point defined in the joint spatial-range domain is assigned with a point of convergence which represents the local mode of the density in this space, e.g., a 3-dimensional space for gray level images. A displacement vector can be defined in the spatial domain as the spatial difference between the convergence point and the original point.

When each pixel in the image is associated with the new range (intensity) information carried by the point of convergence, the method produces discontinuity preserving smoothing. However, when the spatial information corresponding to the convergence point is also exploited, the segmentation process can be defined based on the displacement vectors of each pixel. The convergence points sufficiently close in this joint domain are gathered together to form uniform regions for image segmentation.

The method of the present invention exploits the mean shift-generated displacement vectors to guide active contour models. The robustness of the mean shift is thus combined with a priori information regarding the smoothness of the object contours. This processing is integrated into the method's computationally efficient framework based on ray propagation allowing real time segmentation of medical structures.

Mean Shift Filtering Along a Vector

The mean shift procedure will be illustrated as applied to a 1-dimensional intensity profile which is obtained from a 2D gray level image. Specifically, let $\{x_i, I_i\}_{i=1,\ldots,N}$ and $\{x^*_i, I^*_i\}_{i=1,\ldots,N}$ be the 2-dimensional original and in the spatial-range domain. In addition, the output of the mean-shift filter includes a displacement vector $\{d_1\}_{l=1,\ldots,N}$ which measures the spatial movement of each spatial point. In the method of the present invention, each point in this spatial-range domain is processed via the mean shift operation until convergence. Specifically, the algorithm consists of 3 steps:

For each $i=1, \ldots, N$
1. Initialize $k=1$ and $(x^*k_i, I^*_i{}^k, d_i)=(x_i, I_1, 0)$
2. Compute $$x_i^{*k+1} = \frac{\sum_{j=1}^{M} x_j e^{\frac{-(x_i^{*k}-x_j)^2}{2\sigma_x^2}} e^{\frac{-(I_i^{*k}-I_j)^2}{2\sigma_I^2}}}{\sum_{j=1}^{M} \frac{-(x_i^{*k}-x_j)^2}{2\sigma_x^2} e^{\frac{-(I_i^{*k}-I_j)^2}{2\sigma_I^2}}} \quad (9)$$

$$I_i^{*k+1} = \frac{\sum_{j=1}^{M} I_j e^{\frac{-(x_i^{*k}-x_j)^2}{2\sigma_x^2}} e^{\frac{-(I_i^{k}-I_j)^2}{2\sigma_I^2}}}{\sum_{j=1}^{M} \frac{-(x_i^{*k}-x_j)^2}{2\sigma_x^2} e^{\frac{-(I_i^{*k}-I_j)^2}{2\sigma_I^2}}}$$

until the displacement of spatial points, $x_i$ are small, i.e., $|x^*_i{}^{k+1} - x^*_i{}^k| < \epsilon$ 3. Assign $d_i = (x^*_i{}^{k+l} - x_i)$
4. Assign $(x^*i, I^*i) = (x_i, I^*_i)$ where $\sigma_x$ and $\sigma_I$ determine the Gaussian spatial and range kernels size, respectively. Observe that in the last step of the procedure the original spatial locations, namely $x_1$'s are assigned with the smoothed intensity values.

FIG. 3 illustrates an example where 1-dimensional intensity data is obtained from a slice of a CT (computerized tomography) image. FIG. 3(a) is a CT image of the aorta including one ray illustrated as line a—a, where the left-end point of the line is the beginning of data and the right-end point is the end of data. FIG. 3(b) is a graph representing a 1-dimensional intensity profile obtained along line a-a of FIG. 3(a) and FIG. 3(c) is a graph illustrating the intensity profile of FIG. 3(b) after mean shift filtering. Observe that the mean shift procedure smooths the intensity data while preserving and sharpening its discontinuities. Similarly, FIG. 3(d) illustrates the displacement vectors of each spatial point of the intensity profile of FIG. 3(c), and FIG. 3(e) is a graph illustrating a first derivative of each displacement vector shown in FIG. 3(d). The boundary detection framework of the present invention exploits the information contained in these displacement vectors.

Mean Shift-Based Ray Propagation

Semi-automatic segmentation procedures are very well-accepted in medical image applications because of their fast execution times and their stability. Infact, active contours have been extensively used in medical image segmentation. The present invention uses ray propagation from a single point for vessel segmentation. Specifically, it assume that the vessels are orthogonal to the viewing plane and their boundaries are very similar to circular/elliptical objects. Thus, ray propagation is very well suited for this problem for the following reasons. First, ray propagation is very fast. Second, no topological changes are necessary and no shocks form during the propagation, since rays from a single source point do not collide with each other. Recall that level sets have been the choice of curve evolution problems due to formation of shocks and topological changes that may happen during the evolution. However, based on experiments, level set based segmentation techniques are still too slow for real-time image segmentation.

The mean shift based ray propagation of the present invention is based on an explicit front propagation via normal vectors, rays. Specifically, the evolving contour is sampled and the evolution of each sample is followed in time by rewriting the evolution equation in vector form, namely, $$\begin{cases} x_t(s,t) = S(x,y) \frac{y_s}{\sqrt{x_s^2 + y_s^2}} \\ y_t(s,t) = S(x,y) \frac{x_s}{\sqrt{x_s^2 + y_s^2}} \end{cases} \quad (10)$$

where $S(x,y)$ is a speed function defined as $$S(x,y) = \alpha \frac{f(x,y)}{1.0 + |\nabla d(x,y)|^2} + \beta K(x,y) \quad (11)$$

where d(xy) is the displacement function computed by the mean shift procedure, K(x,y) is the discrete curvature, α and β are constants, and f(x,y) is given by $$f(x, y) = \begin{cases} -\text{sign}(d(x, y)) & \text{if } |\nabla d(x, y)| > 3\sigma_d \\ 1 & \text{else} \end{cases} \quad (12)$$

where the gradient of d(x,y,z), namely $\nabla d(x,y,z)$ is computed along the ray. If an absolute value of the gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary. If an absolute value of a gradient of the displacement vector of the individual ray is less than a predetermined value, the individual ray is propagated from the seed to the boundary. Ideally, rays should propagate freely towards the object boundaries when they are away from them and they should slow down in the vicinity of these object boundaries. If they cross over the boundaries they should come back to the boundary. Observe that all these requirements are satisfied by the choice of speed functions. The mean shift-generated displacement vectors have high gradient magnitude (see point e in FIG. 3(e)) and diverge (see point d in FIG. 3(d)) at the aorta boundary 304. Note that the high gradient magnitude results in low propagation speed, while the divergence property determines the direction of the propagation, i.e., outward inside the aorta and inward outside the aorta.

Figure 4:
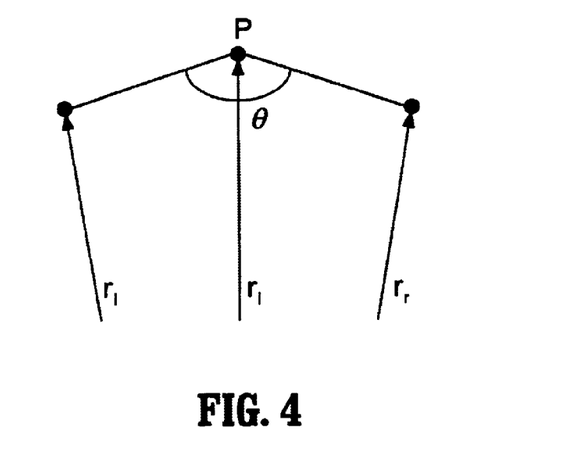
FIG. 4 is a diagram illustrating a curvature of a ray $r_i$ at point P.

Often intensity values inside vessels do not smoothly change. In fact, it is possible that there may be isolated noise which then creates severe problems for the propagation of rays. In addition, the object boundaries may be distorted at isolated locations due to interaction with nearby structures. Because of these irregularities inside vessels and on its boundaries, some smoothness constraints are to be applied on the evolving contour via rays. Thus, K(x,y) is added to the speed function of rays, which forces the front to be smooth during the propagation. $K(x, y)=(1.0-(\theta/PI)^2)$ is used as the curvature value of a ray $r_1$ at point P (x,y) where theta is the angle between two contour segments of neighboring rays $r_1$ and $r_r$ as shown in FIG. 4. The ratio α β controls the degree of desired smoothness.

The speed function also contains the $\sigma_d$ parameter. This statistical parameter is the variation of the magnitude of the displacement function in a region and is learned from the data. Specifically, first rays are initially propagated via constant speed in a small region (circular region). Second, first order statistics, namely, mean, $\mu$ and standard deviation, $\sigma_d$ of gradient displacement function are computed from the sample. It is assumed that locations of the small gradients in a displacement function (less than 3 $\sigma_d$) should not be part of any object boundary.

Figure 5A:
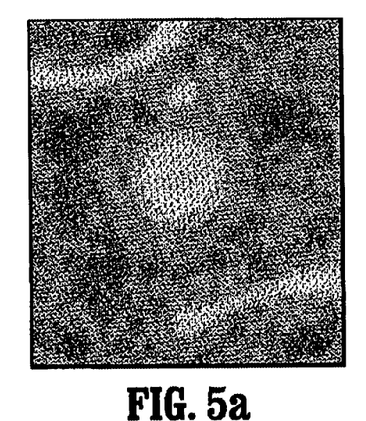
FIGS. 5(a)–(c) illustrate segmentation in a CT image of the aorta and FIGS. 5(d)–(f) illustrate segmentation in a MR image of the aorta.
Figure 5B:
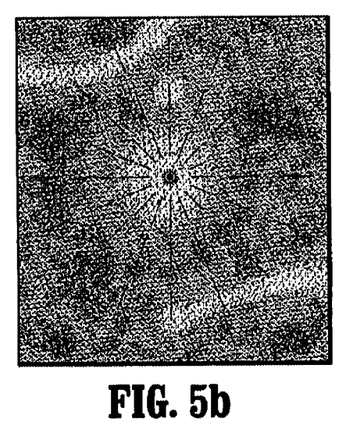
Figure 5C:
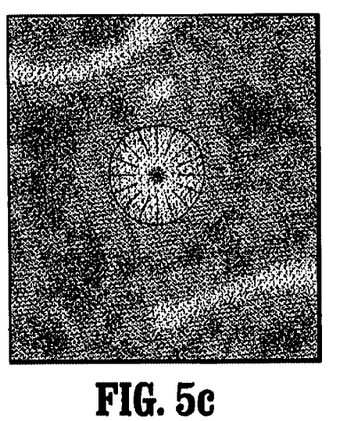
Figure 5D:
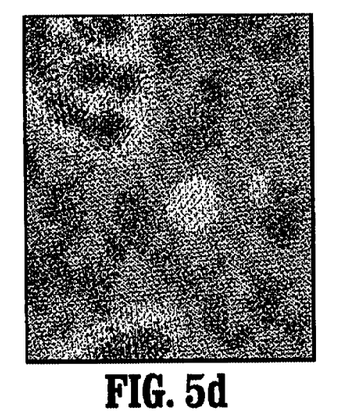
Figure 5E:
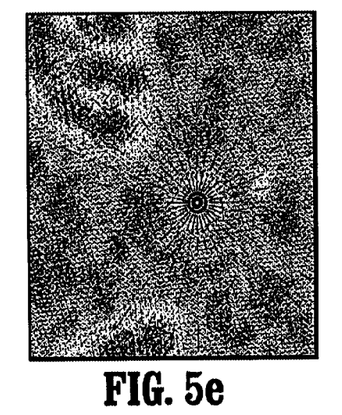
Figure 5F:
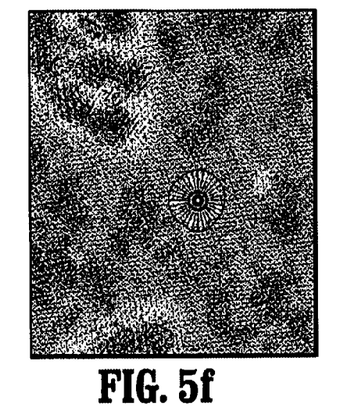
Figure 6A:
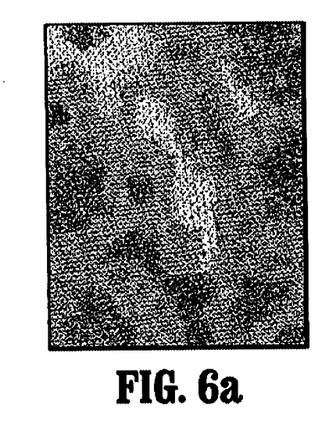
FIGS. 6(a)–(c) illustrate vessel segmentation in a CT image and FIGS. 6(d)–(f) illustrate segmentation in a MR image.
Figure 6B:
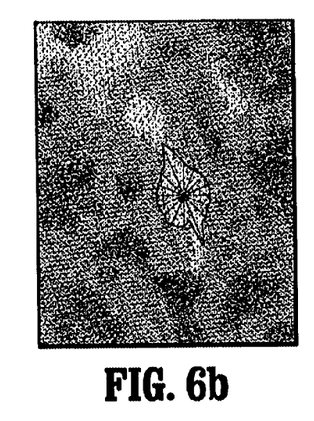
Figure 6C:
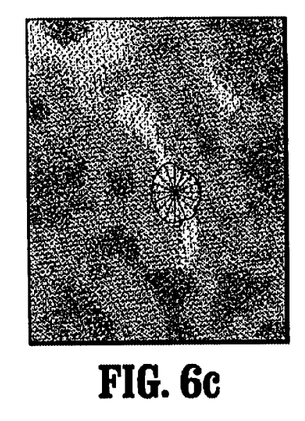
Figure 6D:
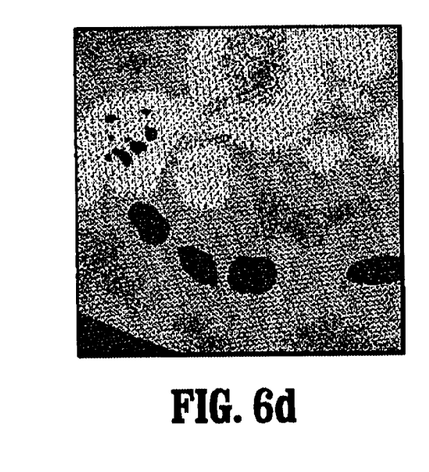
Figure 6E:
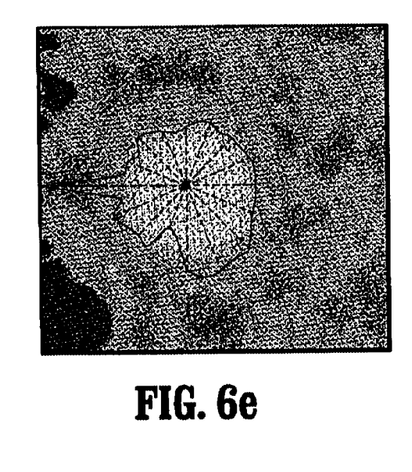
Figure 6F:
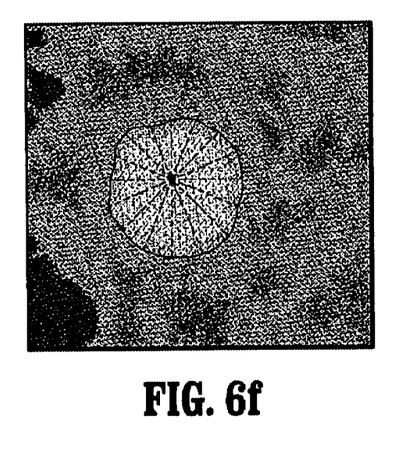

FIG. 5 illustrates the mean shift-based ray propagation where FIGS. 5(a)-(c) illustrate segmentation in a CT image of the aorta and FIGS. 5(d)-(f) illustrate segmentation in a MR image of the aorta. Specifically, FIGS. 5(a) and (d) illustrate an original image of the aorta, FIGS. 5(b) and (e) illustrate rays propagating from a seed inside the structure where a dark portion of the ray indicates a vector pointing towards the center and similarly lighter portions of the ray are the vectors pointing outward from the center of structure. Observe the divergence of the displacement vectors in the vicinity of aorta boundaries. This divergence of vectors are integrated via rays, which then leads to the segmentation of aorta.

FIG. 6 illustrates the need for shape priors, e.g., smoothness constraints, in segmentation on a MR image and a CT image. Shape priors are necessary for two reasons: (i) FIG. 6(a) depicts a case where renal arteries branch from the aorta. The segmentation of the aorta for quantitative measurements via ray propagation without any smoothness constraint would result in large errors due to the renal arteries, as shown in FIG. 6(b). The addition of strong smoothness constraint results in better segmentation of aorta for quantitative measurements, see FIG. 6(c). This example illustrates that the method of the present invention is capable of incorporating simple shape priors. (ii) The smoothness constraint is often needed for the stability of a segmentation process. FIG. 6(d) illustrates a structure in a CT image which has diffused boundaries and a circular dark region in it. Observe that the ray passing over the circular dark region is stopped due to the high displacement vector (or high intensity gradient). In addition, one ray did not stop at the correct boundary due to the very low gradient. FIG. 6(c) illustrates that these isolated errors in the segmentation process can be corrected by the addition of smoothness constraints.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for segmenting structures from two-dimensional (2D) images, the method comprising the steps of:
   receiving 2D image data;
   visualizing the 2D image data on a display device;
   selecting a structure in the 2D image data by placing a seed in the structure;
   initializing a plurality of rays from the seed to form a curve;
   determining a speed function of each of the plurality of rays; evolving the curve by propagating the plurality of rays based on the speed function of each of the plurality of rays by performing a mean-shift analysis on each of the plurality of rays to identify image discontinuities, the image discontinuities defining the structure's boundary, wherein the performing a mean-shift analysis comprises
      determining a joint spatial-range domain for each of the plurality of rays, the joint spatial-range domain including for each pixel along each of the plurality of rays, at least one location value and at least one intensity value,
      defining a point of convergence for each of the plurality of rays to identify the discontinuities based on an intensity value, and
      determining a displacement vector for each of the plurality of rays, the displacement vector being a distance between a point on an individual ray and a convergence point on the individual ray;
   converging the plurality of rays on a boundary of the structure; and
   segmenting the structure when all of the plurality of rays have converged on the structure's boundary.

2. The method of claim 1, further comprising the step of determining an area of the segmented structure.

3. The method as in claim 1, wherein if an absolute value of a gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary.

4. The method as in claim 1, wherein if an absolute value of a gradient of the displacement vector of the individual ray is less than a predetermined value, the individual ray is propagated from the seed to the boundary.

5. The method as in claim 1, wherein the evolving the curve step includes applying a smoothness constraint to the evolving curve.

6. The method as in claim 5, wherein the applying a smoothness constraint includes filtering the speed function of an individual ray of the plurality of rays based on a neighboring ray.

7. The method as in claim 5, wherein the applying a smoothness constraint includes imposing a curvature on the evolving curve based on shape priors.

8. The method as in claim 1, wherein the selecting step includes clicking on the structure with a computer mouse.

9. A program storage device readable by a machine, tangibly embodying a program of instructions executable by the machine to perform method steps for segmenting structures from two-dimensional (2D) images, the method steps comprising:
receiving 2D image data;
visualizing the 2D image data on a display device;
selecting a structure in the 2D image data by placing a seed in the structure;
initializing a plurality of rays from the seed to form a curve;
determining a speed function of each of the plurality of rays; evolving the curve by propagating the plurality of rays based on the speed function of each of the plurality of rays by performing a mean-shift analysis on each of the plurality of rays to identify image discontinuities, the image discontinuities defining the structure's boundary, wherein the performing a mean-shift analysis comprises
determining a joint spatial-range domain for each of the plurality of rays, the joint spatial-range domain including for each pixel along each of the plurality of rays at least one location value and at least one intensity value,
defining a point of convergence for each of the plurality of rays to identify the discontinuities based on an intensity value, and
determining a displacement vector for each of the plurality of rays, the displacement vector being a distance between a point on an individual ray and a convergence point on the individual ray;
converging the plurality of rays on a boundary of the structure; and
segmenting the structure when all of the plurality of rays have converged on the structure's boundary.

10. The program storage device of claim 9, further comprising the step of determining an area of the segmented structure.

11. The program storage device as in claim 9, wherein if an absolute value of a gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary.

12. The program storage device as in claim 9, wherein if an absolute value of a gradient of the displacement vector of the individual ray is less than a predetermined value, the individual ray is propagated from the seed to the boundary.

13. The program storage device as in claim 9, wherein the evolving the curve step includes applying a smoothness constraint to the evolving curve.

14. The program storage device as in claim 13, wherein the applying a smoothness constraint includes filtering the speed function of an individual ray of the plurality of rays based on a neighboring ray.

15. The program storage device as in claim 13, wherein the applying a smoothness constraint includes imposing a curvature on the evolving curve based on shape priors.

16. A system for segmenting structures from two-dimensional (2D) images, the system comprising:
an input device for receiving 2D image data;
a display device for visualizing the 2D image data;
a cursor control device for selecting a structure in the 2D image data by placing a seed in the structure; and
a processor for segmenting the structure from the 2D image data, wherein the processor includes a mean shift filter for filtering each of the plurality of rays to identify image discontinuities in each of the plurality of rays, the image discontinuities defining the structure's boundary,
wherein the mean-shift filter determines a joint spatial-range domain for each of the plurality of rays, the joint spatial-range domain including for each pixel alone each of the plurality of rays at least one location value and at least one intensity value, defines a point of convergence for each of the plurality of rays to identify the discontinuities based on an intensity value, and determines a displacement vector for each of the plurality of rays, the displacement vector being a distance between a point on an individual ray and a convergence point on the individual ray.

17. The system as in claim 16, wherein the processor initializes the plurality of rays from the seed to form a curve, determines a speed function of each of the plurality of rays, evolves the curve by propagating the plurality of rays based on the speed function of each of the plurality of rays, converges the plurality of rays on a boundary of the structure, and segments the structure when all of the plurality of rays have converged on the structure's boundary.

18. The system as in claim 16, wherein the cursor control device is a mouse and a user places the seed in the structure by clicking on the structure.

19. The system as in claim 17, wherein the processor applies a smoothness constraint to the evolving curve.

* * * * *